United States Patent [19]

Alspector et al.

[11] Patent Number: 5,412,256
[45] Date of Patent: May 2, 1995

[54] NEURON FOR USE IN SELF-LEARNING NEURAL NETWORK

[75] Inventors: Joshua Alspector, Westfield; Anthony Jayakumar, Somerset, both of N.J.

[73] Assignee: Bell Communications Research, Inc., Livingston, N.J.

[21] Appl. No.: 178,428

[22] Filed: Jan. 6, 1994

[51] Int. Cl.$^6$ .................. H03K 19/08; H03K 19/2
[52] U.S. Cl. .................. 395/24; 395/21; 395/23; 326/36
[58] Field of Search .................. 301/201, 464; 395/21, 395/23

[56] References Cited

U.S. PATENT DOCUMENTS

| | | | |
|---|---|---|---|
| 4,874,963 | 10/1989 | Alspector | 307/201 |
| 5,087,826 | 2/1992 | Holler et al. | 307/201 |
| 5,107,149 | 4/1992 | Platt et al. | 307/529 |
| 5,126,685 | 6/1992 | Platt et al. | 330/85 |
| 5,165,054 | 11/1992 | Platt et al. | 330/277 |
| 5,253,329 | 10/1993 | Villarreal et al. | 395/24 |
| 5,336,937 | 8/1994 | Sridhar et al. | 307/201 |

OTHER PUBLICATIONS

J. J. Hopfield, "Neural networks and physical systems with emergent collective computational abilities," *Proceedings of the National Academy of Sciences*, 1982, vol. 79, pp. 2554–2558.

D. H. Ackley et al., "A Learning Algorithm for Boltzmann Machines," *Cognitive Science*, 1985, vol. 9, pp. 147–169.

C. Peterson et al., "A Mean Field Theory Learning Algorithm for Neural Networks," *Complex Systems*, 1987, vol. 1, pp. 995–1019.

G. E. Hinton, "Deterministic Boltzmann Learning Performs Steepest Descent in Weight-Space," *Neural Computation*, 1989, vol. 1, pp. 143–150.

J. Alspector et al., "Performance of a Stochastic Learning Microchip," *Proceedings of Advances in Neural Information Processing Systems*, 1988, pp. 748–760.

J. Alspector et al., "Relaxation Networks for Large Supervised Learning Problems," *Proceedings of Advances in Neural Information Processing Systems*, 1991, pp. 1015–1021.

J. Alspector et al., "A VLSI-Efficient Technique for Generating Multiple Uncorrelated Noise Sources and Its Application to Stochastic Neural Networks," *IEEE Transactions on Circuits and Systems*, 1991, vol. 38, pp. 109–123.

*Primary Examiner*—Edward P. Westin
*Assistant Examiner*—Richard Roseen
*Attorney, Agent, or Firm*—Leonard Charles Suchyta; Loria B. Yeadon

[57] ABSTRACT

A neuron for use in a self-learning neural network comprises a current input node at which a plurality of synaptic input currents are summed using Kirchoff's current law. The summed input currents are normalized using a coarse gain current normalizer. The normalized summed inputs current is then converted to a voltage using a current to voltage converter. This voltage is then amplified by a gain controlled cascode output amplifier. Gain control inputs are provided in the output amplifier so that the neuron can be settled by the Mean Field Approximation. A noise input stage is also connected to the output amplifier so that the neuron can be settled using simulated annealing. The resulting neuron is a variable gain, bi-directional current transimpedance neuron with a controllable noise input.

14 Claims, 5 Drawing Sheets

NEURON FOR USE IN SELF-LEARNING NEURAL NETWORK

RELATED PATENT AND PATENT APPLICATION

U.S. Pat. No. 4,874,963 entitled "Neuromorphic Learning Networks" issued Oct. 17, 1989 and assigned to the assignee hereof contains subject matter related to the subject matter of the present application.

U.S. patent application Ser. No. 08/178,228 filed Jan. 6, 1994, entitled Adaptive Equalizer Using Self Learning Neural Network, filed on even date herewith for Joshua Alspector, Timothy X. Brown, and Anthony Jayakumar and assigned to the assignee hereof contains subject matter related to the subject matter of the present application.

The above identified patent and patent application are incorporated herein by reference.

FIELD OF THE INVENTION

The present invention relates to an electronic self-learning neural network. The main components of this neural network are the neurons and synapses which connect the neurons. This type of neural network is self-learning in that the synaptic weights of the network are adjusted by a learning rule that is implemented at each synapse. No external processor is required to determine and download the synaptic weights. Because of the potential for complex dynamics, these networks require a powerful and robust method of settling for learning and for the retrieval of patterns. One such settling method is known as simulated annealing.

More specifically, the present invention is directed to a neuron for use in this type of neural network. The neuron of the present invention is a variable gain, bi-directional, current transimpedance neuron with a controllable noise input for simulated annealing. The neuron of the present invention may be implemented using VLSI.

BACKGROUND OF THE INVENTION

One type of self-learning neural network is known as a Boltzmann Machine. A Boltzmann Machine type neural network uses an algorithm known as the Boltzmann Algorithm to achieve learning. In the Boltzmann Machine, the synapses are symmetric. This means the connections between neurons run forward and backwards and with equal connection strengths in both directions. Thus, the weight of the synaptic connection between the output of neuron j and an input of neuron i is the same as the weight of the synaptic connection between the output of neuron i and an input of neuron j.

A neuron i which forms part of a Boltzmann machine is illustrated in FIG. 1. The neuron i has four inputs labeled 1, 2, 3 and 4. The input 1 is for a threshold current produced by the threshold current generator 10. (Typically, the threshold current generator is simply an unused neuron in the neural network.) The input 2 is a current $w_{ji}s_j$, where $w_{ji}$ is the weight of the synaptic connection 14 between the output of neuron j (not shown) and an input of the neuron i and $s_j$ is the output state of the neuron j. The weight $w_{ji}$ is formed by a weighting circuit 12 located in the synaptic connection 14. The input 3 is a current $w_{ki}s_k$ where $w_{ki}$ is the weight of a synaptic connection 16 between the output of a neuron k (not shown) and an input of the neuron i and $s_k$ is the output state of the neuron k. The weight $w_{ki}$ is formed by a weighting circuit 18 located in the synaptic connection 16. In general, the neuron i receives a plurality of weighted input currents from other neurons but only two such inputs, i.e., 2 and 3, are shown in FIG. 1 for purposes of illustration.

The input 4 is a noise input. A noise current is generated by the noise generator circuit 20 and inputted to the neuron i via input 4. The noise input 4 is used for simulated annealing and is discussed in greater detail below.

The neuron i has a voltage output $s_i$. The output $s_i$ can take on a range of values between two values "off" or "on" or "0" or "1" (See FIG. 5 for the values the output $s_i$ can take). In general, if the sum of the currents including the threshold current is less than zero, the neuron output $s_i$ is closer to the off state (0 volts in FIG. 5). If the sum of the currents including the threshold current exceeds zero, the neuron output $s_i$ is closer to the on state (5 V in FIG. 5).

As the network is symmetric, the output $s_i$ of neuron i is connected via the synaptic connection 22 to the neuron j. The synaptic connection 22 contains the weighting circuit 24 whose weight $w_{ij}$ is equal to $w_{ji}$. The output $s_i$ of the neuron 24 is also transmitted via synapse 26 to the neuron k. The synaptic connection 26 includes the weight circuit 28 whose weight $w_{ik}$ equals $w_{ki}$. The weights $w_{ji}$, $w_{ij}$ are controlled by the control circuit 30. The control circuit 30 receives the output signals of the neurons, i and j, i.e., $s_i$ and $s_j$, and, in response, outputs a signal to control the weights $w_{ij}$ and $w_{ji}$. The weights $w_{ki}$ and $w_{ik}$ are controlled by the control circuit 31. The control circuit 31 receives the outputs $s_i$ and $s_k$ of the neurons i and k and outputs signals to control the weights $w_{ik}$ and $w_{ki}$. In general, there is a control circuit to control the weight of each symmetric synapse in the network.

The control of the synaptic weights takes place as follows. Usually, a Boltzmann Machine type neural network has an input layer of neurons, an output layer of neurons and one or more hidden layers of neurons in between the input and output layers. FIG. 2 schematically illustrates a set of neurons 70 organized into an input layer 72, an output layer 74, and a hidden layer 76. The bi-directional synaptic connection between each pair of neurons is also illustrated in FIG. 2.

The Boltzmann learning algorithm works in two phases. In phase "plus" the neurons in the input and output layers are clamped to a particular pattern that is desired to be learned while the network relaxes through the use of simulated annealing or another technique. In phase "minus", the output neurons are unclamped and the system relaxes while keeping the input neurons clamped. (Note that the neuron i of FIG. 1 includes no clamping circuits, thus it is a neuron in a hidden layer). The goal of the learning process is to find a set of synaptic weights such that the learned outputs of the "minus" phase match the desired outputs in the "plus" phase as nearly as possible. The probability that two neurons i and j are both "on" in the plus phase, $P_{ij}^+$, can be determined by counting the number of times both neurons are activated averaged across some or all patterns (input-output mappings) in a training set. For each mapping, co-occurrence statistics are also collected for the minus phase to determine $P_{ij}^-$. Both sets of statistics are collected by the control circuit of the particular symmetric synapse after annealing. In the preferred implementation, the co-occurrence statistics are collected for one pattern as it is being presented rather then being collected for the entire training set so that a weight adjustment occurs after each pattern.

More generally, after sufficient statistics are obtained by the control circuit, the weights are updated according to the relation $$\Delta w_{ij} = \eta(P_{ij}^+ - P_{ij}^-)$$

where $\eta$ scales the size of each weight change.

The simulated annealing technique involves perturbing the threshold signals of all neurons in a random fashion while clamping signals are applied to all of the neurons in one or both of the input and output layers of the network. As shown in FIG. 1, the perturbing random signal may be obtained from an electrical noise generator 20 connected to the neuron. By introducing noise there is introduced into the neural network a quantity analogous to thermal energy in a physical system. This "heat" is applied to the network to cause the network to visit all possible states. Then as the temperature (i.e., noise level) is reduced to some minimum, there is a high probability that the network will settle to its lowest energy state, i.e. a global minimum.

As an alternative to simulated annealing, a deterministic method known as the Mean Field Approximation (MFA) may be used. According to this method, the slope of a hyperbolic-tangent-like transfer function (See FIG. 5) of an amplifier used to implement the neuron is varied from zero to a maximum.

It is an object of the invention to provide a neuron for use in a self-learning neural network such as a Boltzmann Machine. It is a further object to provide a neuron for use in a self-learning neural network which can be used with the simulated annealing or Mean Field Approximation method for settling the network. It is a further object to provide a neuron which can cascade with many other neurons on a single VLSI chip to form a complete neural network on the chip, and also with other such similar chips, to form a multi-chip system.

SUMMARY OF THE INVENTION

In accordance with an embodiment of the invention, a neuron for use in a self-learning neural network comprises a bi-directional current summation node. The current summation node sums the neuron input currents according to Kirchoff's current summation law. A current flowing into the neuron is positive and a current flowing out is negative. The summed input currents are then normalized by a current normalizer circuit. The normalized summed current is then converted to a voltage using a low impedance current to voltage converter. The output voltage of the converter represents the summation of the synaptic input currents of the neuron.

The next stage of the neuron is a gain controlled cascode output stage. The voltage generated by the converter modulates a differential current flowing in the cascode output stage to control the output voltage of the neuron. The gain of the cascode output stage can be continuously varied to permit settling using the Mean Field Approximation. Specifically, the slope of the hyperbolic-tangent-like transfer function of the cascode output stage can be varied from a low level to a high level. Alternatively, settling is achieved using simulated annealing. The noise current for simulated annealing is added to the gain controlled cascode output stage. The noise is added by a differential pair whose current can be varied to provide a capability to modulate the noise envelope. The modulation of the noise envelope is important for simulated annealing because the annealing noise which causes the network to visit all possible states is gradually reduced to cause the network to settle with a high probability in the state with minimum energy. The neuron output is terminated through an external resistor which enables control over the output dynamic range.

The above-described neuron architecture has several significant advantages. These are:

1. Bi-directional Transimpedance

One of the computations that the neuron performs is to sum the weighted input currents from the synapses. Thus, it is advantageous to have current inputs because currents are naturally added by Kirchoff's current summation law. The neuron of the present invention uses a bi-directional single ended current summing technique. This has the advantage of reducing the number of input lines by half in comparison to using a differential approach to current summing.

2. Low Input Impedance

VLSI implementations of neural networks usually have tens or hundreds of neurons on the same chip. Usually, the inputs of these neurons are not accessible directly because they normally have high input impedance and bringing the neuron inputs outside the chip would result in problems such as uncontrolled noise and cross-talk. The neuron of the present invention has a low input impedance (e.g. 200 ohms) which enables direct access to the neuron.

3. Current Normalization

The input current levels will rise as the network size increases. To accommodate this increase, the sensitivity of the neurons may be reduced. To accomplish this, the neuron of the present invention incorporates current normalization circuitry.

4. Stochastic Settling

To enable the network to relax to its global minimum energy, the inventive neuron is capable of simulated annealing. An uncorrelated digital pseudo-random bit-stream is fed into each neuron. Due to the low pass filtering of the cascode output stage, the digital noise is converted to analog uncorrelated noise. By modifying the tail current in the noise input differential pair, a very linear modulation of the noise envelope is achieved. This enables stochastic annealing.

5. Deterministic Settling

As an alternative to simulated annealing, the inventive neuron is capable of being settled using the Mean Field Approximation. A differential gain control signal switches the currents in the output cascode stage enabling smooth gain variation from a negative maximum through zero to a positive maximum.

DETAILED DESCRIPTION OF THE INVENTION

Figure 1:
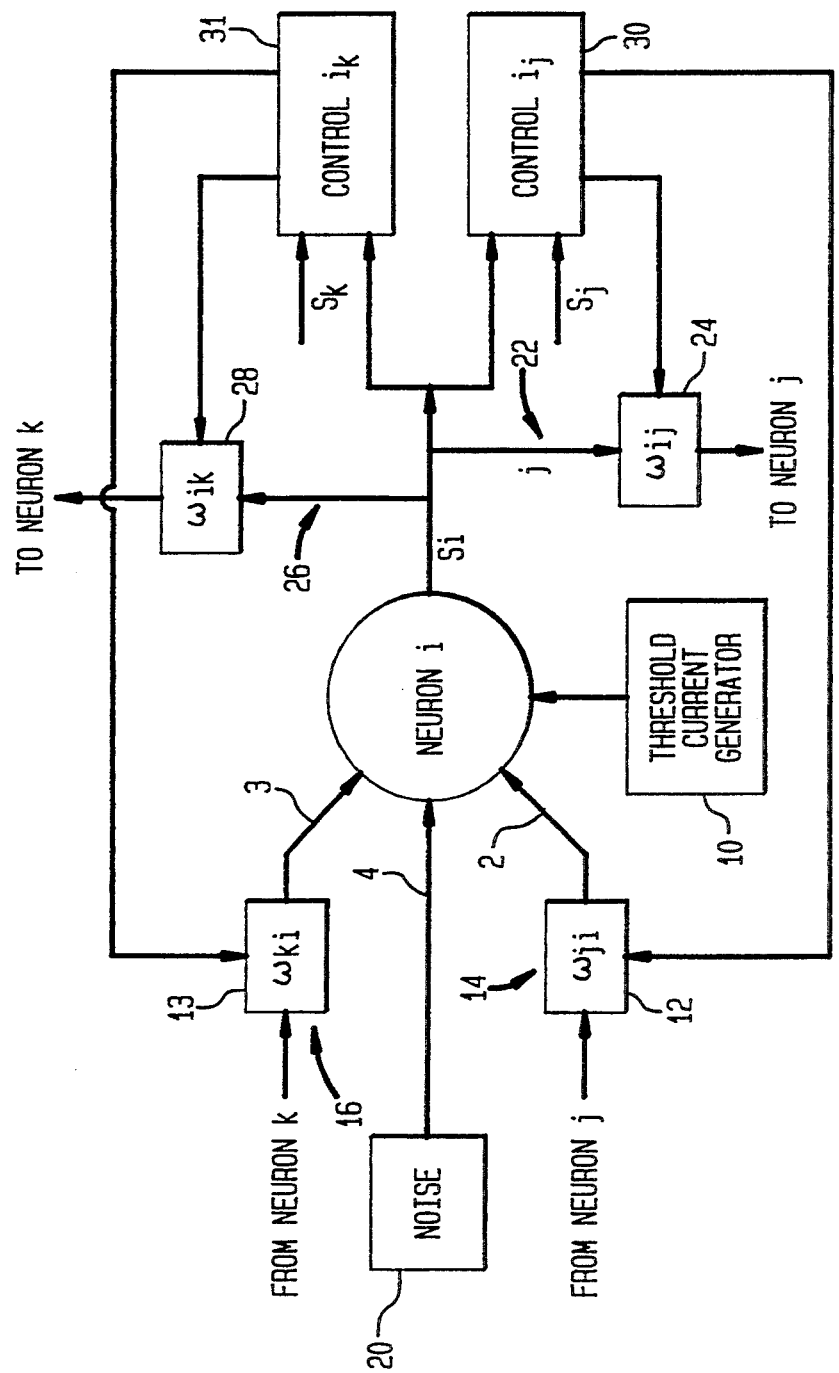
FIG. 1 schematically illustrates a neuron i and its interconnection to other neurons in a Boltzmann Machine type neural network.
Figure 2:
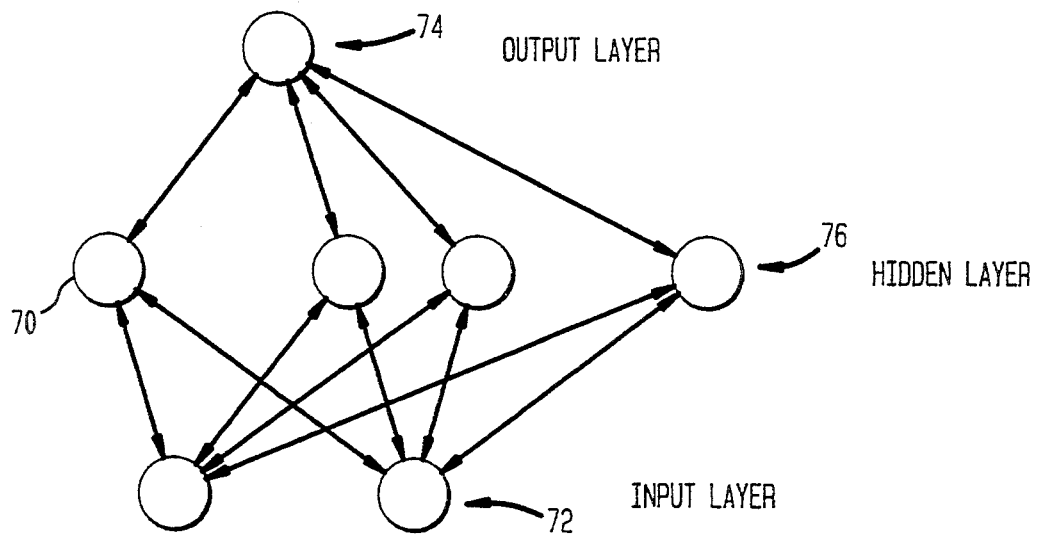
FIG. 2 illustrates a Boltzmann Machine type neural network having neurons arranged in an input layer, a hidden layer, and an output layer.
Figure 3:
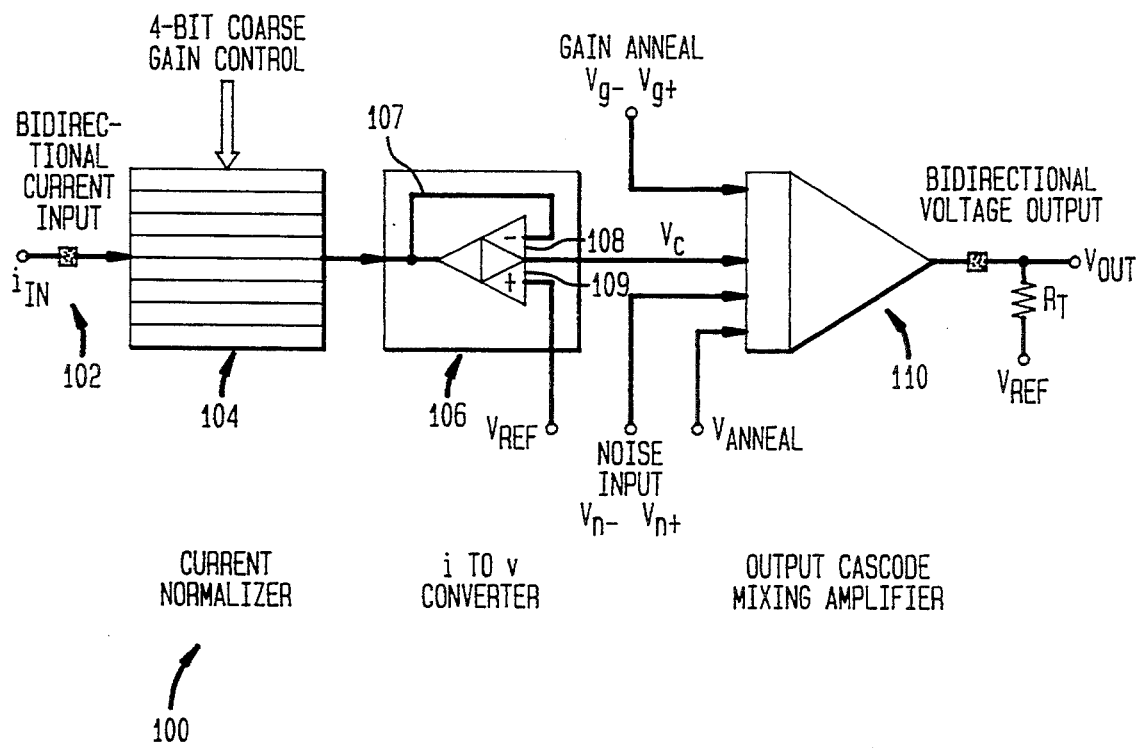
FIG. 3 is a block diagram of a neuron according to an illustrative embodiment of the invention.

A neuron 100 in accordance with the present invention is illustrated in FIG. 3. The neuron 100 comprises a bi-directional current input node 102 via which a current $I_{in}$ is inputted into the neuron. The current $I_{in}$ represents the summation of the synaptic input currents to the neuron 100. The current $I_{in}$ is positive for net current flow into the neuron and negative for net current flow out of the neuron. The summation takes place according to Kirchoff's current law at the current input node 102.

The current input node 102 is connected to a current normalizer 104. The summed input current is normalized or scaled in a switch settable manner using the current normalizer 104. The scale value used by the current normalizer is determined by a four bit input, in the present implementation leading to 16 different values of normalization.

The normalized current outputted by the current normalizer 104 is connected to a current to voltage converter 106. The inputs to the current to voltage converter are the normalized current and a reference voltage $V_{ref}$. The current to voltage converter 106 is implemented by a cascode amplifier with the output 107 tied back to the inverting input 108 as in a voltage follower. The reference voltage is inputted at the non-inverting input 109. The class AB output 107 provides a source and sink for the current $I_{in}$. This negative feedback amplifier has a low impedance (100–200 ohms) and has an output voltage $V_c$ which varies about $V_{ref}$.

The output voltage $V_c$ from the converter is connected to an output cascode mixing amplifier 110. The inputs to the output cascode mixing amplifier 110 are $V_c$, $V_{n+}$, $V_{n-}$, $V_{bna1}$, $V_{bna2}$ and $V_{g+}$, $V_{g-}$. The signals $V_{n+}$, $V_{n-}$ are differential (complementary) digital signals generated by a noise generator to input noise into the neuron. The signals $V_{bna1}$, $V_{bna2}$ are analog signals that control the envelope of the injected noise signal. These inputs are used for simulated annealing. The neuron can also be settled using the Mean Field Approximation. In this mode, the differential gain control inputs $V_{g+}$, $V_{g-}$ vary the gain of the cascode mixing amplifier 110.

Figure 4:
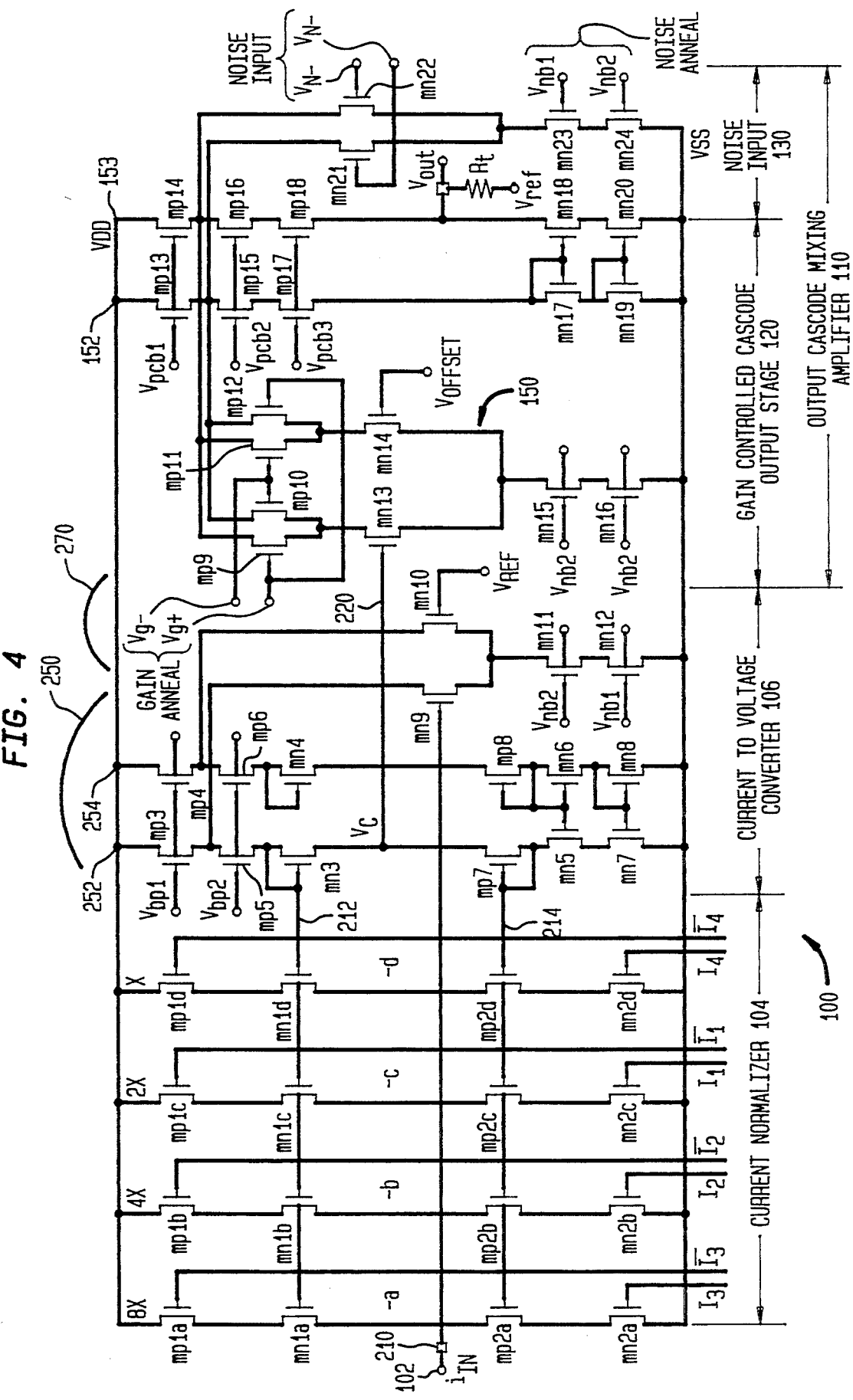
FIG. 4 shows the neuron of FIG. 3 in greater detail.

The neuron 100 is illustrated in greater detail in FIG. 4. As shown in FIG. 4, the current normalizer 104 comprises four current carrying paths a, b, c, d. The paths a, b, c, d extend between a positive supply voltage VDD and a negative supply voltage VSS which may be viewed as the system ground. The path a has the transistors mp1a, mn1a, mp2a, mn2a. The path b has the transistors mp1b, mn1b, mp2b, mn2b. The path c has the transistors mp1c, mn1c, mp2c, mn2c. The path d has the transistors mp1d, mn1d, mp2d, mn2d. As used herein "mp" designates a p-channel device and "mn" designates an n-channel device. The transistors in the paths a,b,c,d, are sized in the ratio 8:4:2:1. The paths a-d are controlled by the switching transistors mp1a-d, mn2a-d. The states of these transistors are determined by the input signals $a_3$, $\bar{a}_3$, $a_2$, $\bar{a}_2$, $a_1$, $\bar{a}_1$, $a_0$, $\bar{a}_0$. These input signals are used to turn on particular ones of the paths a-d with a four bit sensitivity.

The control transistors mp2a-d, mn1a-d allow the currents to flow in the four paths a,b,c,d. The voltages at the gates of these transistors move up or down depending on the summed current $I_{in}$. This control is effected by the current to voltage converter 106 via paths 212 and 214.

In a preferred embodiment, the four paths a, b, c, d of the current normalizer 104 are laid out in a common centroid fashion in silicon to reduce processing variations. The switch transistors mp1a-d, mn2a-d, are MOS devices with long channels. This raises the channel resistance when a transistor is in the on state, thus linearizing the response. This also performs a current limiting function by preventing large currents from flowing in the paths a-d. As the current increases in these paths, the drain-source voltage of the switch transistors mp1a-d, mn2a-d increases, pinching the drain-source voltage of the control transistors mp2a-d, mn1a-d thus limiting the current.

As shown in FIG. 4, the current to voltage converter 106 comprises a cascode stage 250 with two cascode legs. The first leg 252 comprises the transistors mp3, mp5, mn3, mp7, mn5, mn7. The second leg 254 comprises the transistor mp4, mp6, mn4, mp8, mn6, mn8. The voltages $V_{pb1}$ and $V_{pb2}$ are bias voltages.

An amplifier stage 270 comprises the transistors mn9, mn10, mn11, mn12. The gate of mn10 is at $V_{ref}$ which is typically 2.5 volts. The transistors mn9, mn10 form a differential pair. In the absence of a net input current $I_{in}$, the gate of the transistor mn9 is also at $V_{ref}$ and so is the path 210 leading to the input node 102. Thus, the input node 102 provides a low impedance point for current summation. In addition, the currents in the two cascode legs 252, 254 are equal. The voltages $V_{nb2}$ and $V_{nb1}$ are bias voltages.

The currents in the legs a,b,c,d, of the current normalizer 104 mirror the current of the cascode leg 252. If all the paths a, b, c, d in the current normalizer 104 are on, the current in the legs a, b, c, d can be sixteen times the current in the cascode leg 252. If only the smallest ratio path d is on, the current mirror ratio is 1:1. When $I_{in}$ is positive at the node 102, current flows into the neuron via transistors mp2a-d and mn2a-d. The gate voltage of mp7 moves lower to let the transistors mp2a-d carry this current. When the net input current $I_{in}$ is negative, the transistors mp1a-d, mn1a-d, source current and the gate voltage of mn3 moves higher to let transistors mn1a-d carry this current. The voltage $V_c$ which is the output voltage of the current to voltage converter 106 also moves up or down depending on the direction of the input current in the path 210. Specifically, a non-zero input current $I_{in}$ unbalances the differential pair mn9, mn10 in the amplifier stage 270. This in turn changes the current in the two cascode legs 252, 254 so that the current in the two legs is not equal. Thus, in this manner, the bi-directional current at the input in path 210 is converted to the output voltage $V_c$ in path 220.

To reduce the power consumption of the current to voltage converter 106, the following technique is utilized. The silicon process is an n-well process so the substrate of the p-channel control transistors mp2a-d in the current normalizer 104 are connected to VDD. But the substrate of the current mirror transistor mp7 in the converter 106 is connected to its source. This eliminates the body effect on mp7, thus reducing its source-to-drain voltage by about 20 mV, which is just enough to turn off the mp2a-d current during zero input current. Thus, very low power consumption is achieved in the converter 106 in spite of class AB operation.

The output $V_c$ of the current-to-voltage converter is transmitted to the output cascode mixing amplifier 110. The output cascode mixing amplifier is also shown in greater detail in FIG. 4. The output cascade mixing amplifier 110 comprises a gain controlled cascode output stage 120 and a noise input stage 130. The voltage $V_c$ on path 220 from the previous stage represents the magnitude and direction of the synaptic summation currents. This voltage is fed to a differential stage 150 formed by the transistors mn13–mn16. Specifically, the voltage $V_c$ is connected to the gate of the transistor mn13. A voltage $V_{offset}$ is applied to the gate of mn14. The voltage $V_{offset}$ is nominally at about 2.37 V to cancel the offset of the neuron output.

The transistor pairs mp9, mp10 and mp11, mp12 are current splitters that control the amount of current entering the cascode legs 152 and 153. The cascode leg 152 comprises the transistors mp13, mp15, mp17, mn17, mn19. The cascode leg 153 comprises the transistors mp14, mp16, mp18, mn19, mn20. At zero differential input in the gain anneal signals $V_{g-}$, $V_{g+}$ and the signal inputs $V_c$, $V_{offset}$, the current flowing through each of the cascode legs 152, 153 is the same. Hence, there is no current flowing in the output resistor $R_T$, causing the output voltage $V_{out}$ of the neuron 100 to be at 2.5 volts. Due to offsets, $V_{out}$ will not be at exactly 2.5 volts, but this can be corrected using $V_{offset}$. As this balance is changed by introducing a differential voltage between the gates of the transistors mp13–mp14, the top of leg 152 (mp13, mp15, mp17) has a different current from the top of leg 153 (mp14, mp16, mp18). However, the bottom of leg 152 (mn17, mn19) has the same current as the bottom of leg 153 (mn18, mn20) due to current mirror action. The difference is made up for from the current flowing through $R_T$ which produces a voltage at $V_{out}$.

Figure 5:
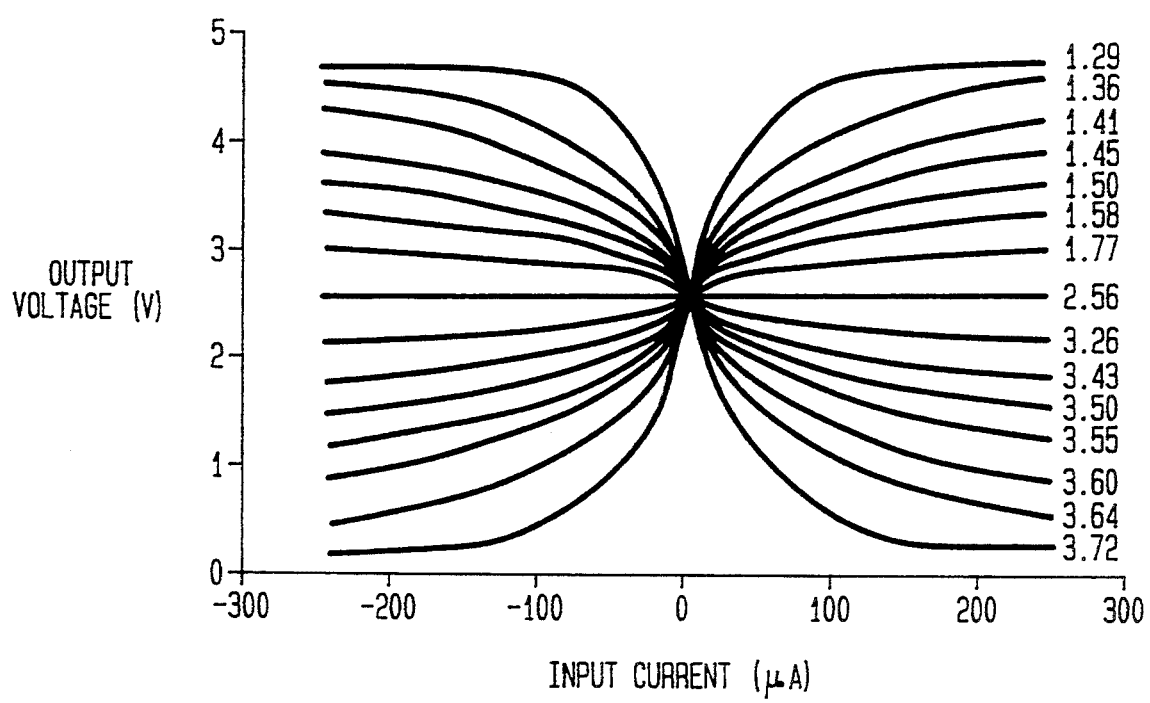
FIG. 5 is a plot of the neuron transfer function for various gain values.

This distribution of current can also be varied by the differential gain anneal signals $V_{g-}$, $V_{g+}$ which acts on top of the signal inputs $V_c$, $V_{offset}$, to achieve a smooth gain variation at the output $V_{out}$ from a positive maximum to a negative maximum. The gain characteristics of the gain controlled cascode output stage 120 are illustrated in FIG. 5 for different values of $V_{g-}$, $V_{g+}$.

The termination of the neuron 100 of FIG. 4 using the resistor $R_T$ provides the following advantages. First, at zero input, the output voltage $V_{out}$ can be set to 2.5 volts by the $V_{offset}$ control. Because the input to the neuron is fixed at 2.5 volts by the current-to-voltage converter 106, this arrangement provides a stable zero reference for the entire neural network. Second, the output resistor $R_T$ in conjunction with the load capacitance of the $V_{out}$ node determines the frequency response of the entire neuron. This enables a single pole roll-off characteristic for the output stage 120 of the neuron 100, thereby ensuring stability. The output resistor $R_T$ determines the settling time of the neuron, thereby enabling control over the network dynamics. Moreover, as $R_T$ is external to the chip containing the neuron, the value of $R_T$ can be varied and, therefore, matched to the input dynamic linear range of the synapses.

The noise input stage 130 of FIG. 4 provides a convenient way of adding noise which is required by the Boltzmann Algorithm. A high speed pseudo-random digital pulse is applied to the inputs $V_{n-}$, $V_{n+}$ of the noise differential pair mn21, mn22. This signal modulates the current in the cascode stage 120 and the output resistor converts this to part of the output voltage $V_{out}$. The bandwidth of the neuron limits the high frequency components of the noise and forms an analog noise signal that can be used to settle the network by annealing. The annealing is done by reducing the current in the tail (mn23, mn24) of the differential pair (mn21, mn22). This reduction in the tail current is accomplished by using the noise anneal voltage $V_{bna1}$, $V_{bna2}$. The generation of $V_{bna1}$, $V_{bna2}$ is discussed below.

Figure 6:
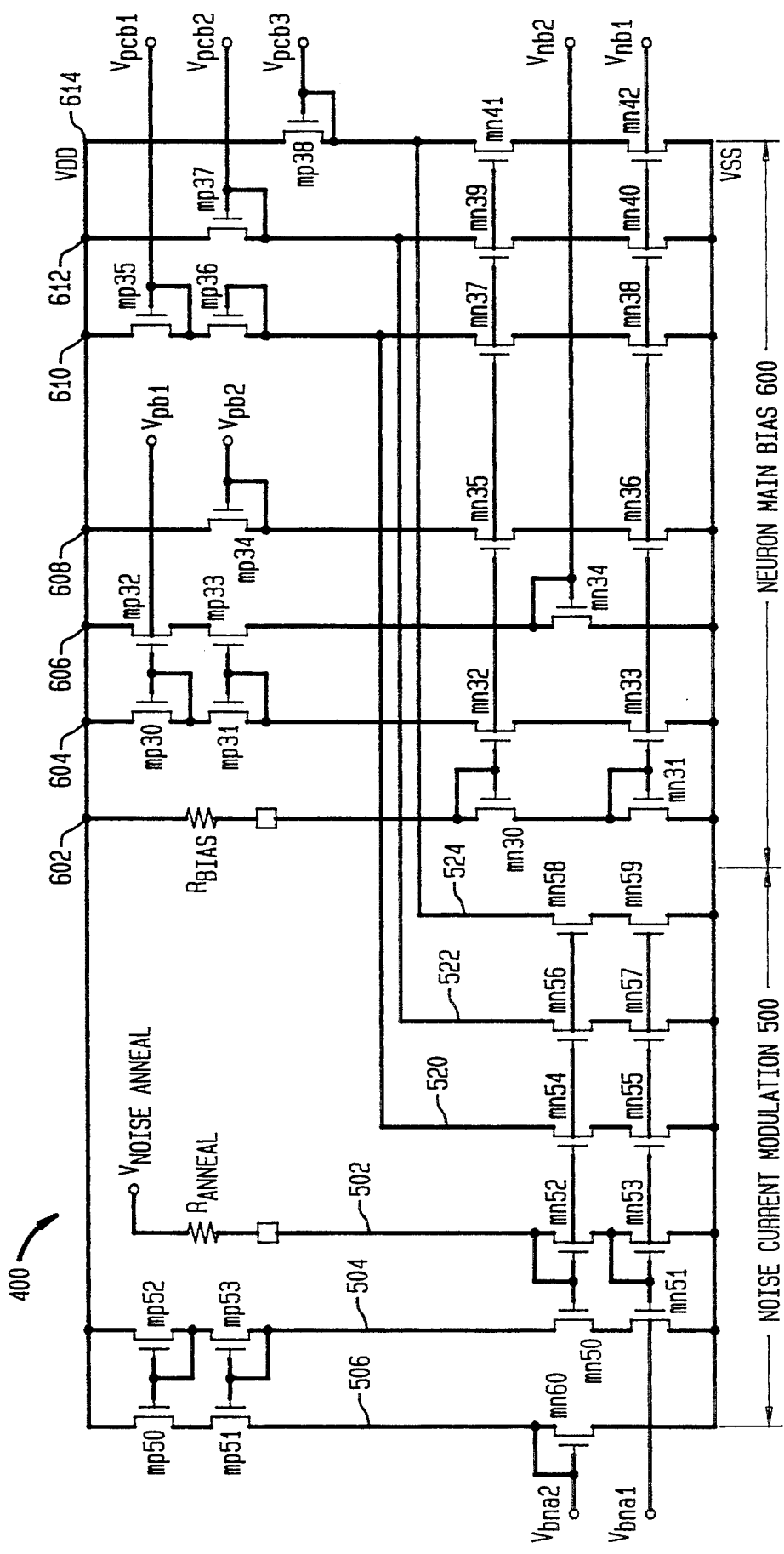
FIG. 6 illustrates a bias circuit for use with the neuron of FIGS. 3 and 4.

As indicated above, the current to voltage converter utilizes the bias voltages $V_{pb1}$, $V_{pb2}$, $V_{nb1}$, $V_{nb2}$. The output cascode mixing amplifier 110 utilizes the bias voltages $V_{pcb1}$, $V_{pcb2}$, $V_{pcb3}$. These bias voltages are generated in the neuron bias circuit 400 illustrated in FIG. 6. The neuron bias circuit 400 also generates the noise anneal signals $V_{bna1}$, $V_{bna2}$.

The neuron bias circuit 400 comprises a noise current modulation stage 500 and a neuron main bias stage 600.

The neuron main bias stage comprises seven legs 602, 604, 606, 608, 610, 612, 614. The legs extend between VDD and VSS. The leg 602 comprises the transistors mn30 and mn31 and the resistor $R_{bias}$. The leg 604 comprises the transistors mp30, mp31, mn32, mn33. The leg 606 comprises the transistors mp32, mp33, mn34. The leg 608 comprises the transistors mp34, mn35, mn36. The leg 610 comprises the transistors mp35, mp36, mn37, mn38. The leg 612 comprises the transistors mp37, mn39, mn40. The leg 614 comprises transistors mp38, mn41, mn42. A reference current is generated in $R_{bias}$ in leg 602. This current is mirrored in legs 610, 612, 614 by mn37 and mn38, mn39 and mn40, and mn 41 and mn42. The W/L (width/length) ratio of the p-transistor in the legs 610, 612, 614 is 16:8:1. This ensures the bias voltages $V_{pcb1}$, which is obtained at the gate of mp35 in leg 610, $V_{pcb2}$ which is obtained at the gate of mp37 in leg 612, and $V_{pcb3}$, which is obtained at the gate of mp38 in leg 14, are such that the p-channel transistors mp13–mp18 (see FIG. 4) are maintained in saturation during normal operation and maintains the voltage swing of the neuron cascode output stage 120 to within 300–400 mV of VDD.

The bias voltage $V_{nb1}$ is obtained at mn31 in leg 604 and the bias voltage $V_{nb2}$ is obtained at mp30 in leg 604. The bias voltage $V_{pb1}$ is obtained at mp32 in leg 606 and the bias voltage $V_{pb2}$ is obtained at mp34 in leg 608.

The operation of the noise current modulator stage is now considered. The noise current modulator stage 500 comprises the legs 502, 504, 506, 520, 522, 524.

The leg 502 comprises the resistor $R_{anneal}$ and the transistors mn52 and mn53. The leg 504 comprises the transistors mp52, mp53, mn50, mn51. The leg 506 comprises the transistors mp50, mp51 and mn60. The leg 520 comprises the transistors mn54 and mn55. The leg 522 comprises the transistors mn56 and mn57. The leg 524 comprises the transistors mn58 and mn59.

A voltage $V_{noise\ anneal}$ is applied to the resistor $R_{anneal}$ to generate a noise modulation current. This current is mirrored in the legs 520, 522 and 524. This current is also mirrored in the legs 504 and 506 wherein the voltage $V_{bna1}$ is obtained at mn53 and $V_{bna2}$ is obtained at mn60. As indicated above, the voltages $V_{bna1}$, $V_{bna2}$ are used to generate a slowly decaying noise envelope for use in the simulated annealing process.

The addition of noise increases the current in the output stage 120 and the bias voltages $V_{pcb1}$, $V_{pcb2}$, $V_{pcb3}$ may not be correct in this case. So during noise anneal, the bias currents are modulated to maintain the transistors mp13–mp18 in saturation. This is done by pulling currents equal to the noise modulation current from the bias leg 610, the bias leg 612 and the bias leg 614 by the paths 520, 522, and 524 respectively.

In short, a neuron for use in a self-learning neural network has been disclosed. The neuron is a variable gain, bi-directional, current transimpedance neuron. The neuron may be settled using simulated annealing or the Mean Field Approximation. The neuron may be implemented using VLSI.

Finally, the above described embodiments of the invention are intended to be illustrative only. Numerous alternative embodiments may be devised by those skilled in the art without departing from the spirit and scope of the following claims.

We claim:

1. A neuron for use in a self-learning neural network comprising,
   - an input node for summing a plurality of bi-directional synaptic input currents to obtain a summed bi-directional input current,
   - a current normalizer for normalizing said summed input current to obtain a normalized summed input current,
   - a current to voltage converter for converting the normalized summed input current into a bi-directional voltage representative of the normalized summed bi-directional input current, and
   - an output amplifier having a gain for generating bi-directional output voltage in response to said voltage representative of said normalized summed input current.

2. The neuron of claim 1 wherein said input node sums said synaptic input currents using Kirchoff's current summation law.

3. The neuron of claim 1 wherein said current normalizer is a coarse gain current normalizer whose normalization factor is selected in response to a plurality of binary selection signals.

4. The neuron of claim 3 wherein said current normalizer comprises a plurality of current paths each of which is selected by one of said binary selection signals.

5. The neuron of claim 1 wherein said current to voltage converter comprises a cascode amplifier having an output connected back to an inverting input.

6. The neuron of claim 1 wherein said output amplifier includes a circuit for varying a gain of the output amplifier so the neuron can be settled using the Mean Field Approximation.

7. The neuron of claim 1 wherein said output amplifier includes a circuit for injecting noise into the output amplifier so the neuron can be settled using simulated annealing.

8. The neuron of claim 7 wherein said noise is modulated by a noise envelope which is slowly decaying.

9. The neuron of claim 1 wherein an output of said output amplifier is connected to an output resistor.

10. The neuron of claim 1 wherein said neuron is connected to a neuron bias circuit, said neuron bias circuit comprising a noise modulator stage for generating a signal representative of a noise envelope and a neuron bias stage for generating bias voltages for said converter and said output amplifier.

11. The neuron of claim 1 wherein said neuron comprises at least part of a VLSI chip.

12. The neuron of claim 1 wherein said output amplifier comprises,
    - a cascode stage comprising a pair of cascode legs,
    - a circuit for altering a current balance in the cascode legs in response to said voltage representative of said normalized summed input current,
    - a circuit for altering the current balance in the cascode legs in response to a gain control signal, and
    - a circuit for generating a noise current with a decaying envelope for altering the current balance in the cascode legs.

13. A neuron for use in a neural network comprising:
    - a current normalizer for normalizing an input current,
    - a current to voltage converter for converting said input current into a voltage representative of said input current, and
    - an output cascode mixing amplifier having a first input for receiving said voltage representative of said input current, a second input for receiving a gain anneal signal for settling said neuron using the Mean Field Approximation and a noise input for receiving a noise signal and a noise anneal input for providing a decaying envelope for the noise signal to settle the neuron using the simulated annealing.

14. The neuron of claim 13 wherein said current normalizer is a coarse current normalizer.

* * * * *